Patented Oct. 26, 1943

2,332,779

UNITED STATES PATENT OFFICE 2,332,779

DYESTUFFS OF THE ANTHRAQUINONE SERIES

Edwin C. Buxbaum, Swarthmore, Pa., assignor to E. I. du Pont de Nemours & Company, Wilmington, Del., a corporation of Delaware No Drawing. Application September 24, 1940, Serial No. 358,101

4 Claims. (Cl. 260—367)

This invention relates to the preparation of new dyestuffs of the anthraquinone series and more particularly to the preparation of new dyestuffs of the dianthrimide sulfonic acid class which dye wool and related fibers in gray shades.

In general, the dyes of the anthraquinone series which are employed for the dyeing of wool and related fibers are generally considered as simple substitution derivatives of anthraquinone of relatively low molecular weight since they contain only one anthraquinone group. While in the prior art sulfonation derivatives of higher molecular weight compounds of the anthraquinone series such as dianthrimides and a few trianthrimides have been described as dyes for wool it has been found that in general these dyes are of little or no value for this purpose, for they show poor affinity for the fiber and therefore poor building up properties or are deficient in fastness properties.

While there are a number of dyestuffs in the anthraquinone series produced which dye wool in gray shades those commonly employed are dyes which dye directly in other colors and which are converted to grays by chroming. Considerable work has been done in an attempt to find new dyestuffs of the anthraquinone series which will dye the fiber directly in gray shades and which will exihibit good fastness properties.

It is therefore an object of this invention to produce new dyestuffs of the anthraquinone series which dye wool and related fibers in gray shades, which exhibit good dyeing and fastness properties, and show relatively small change in shade on chroming.

I have found that dyes of the dianthrimide series can be prepared which dye wool and related fibers in desirable gray shades and which show good tinctorial power where there is present in the anthrimide nucleus phenylamino radicals which carry at least one methyl group in the benzene ring. These compounds can be readily sulfonated in the benzene rings under more mild conditions than are usually required to sulfonate the dianthrimide compounds. They dye wool and related fibers in desirable gray shades much redder in shade than the colors obtained where unsubstituted phenyl amino groups are present in otherwise similar molecules. They also show much improved affinity for the fiber over those dyestuffs which do not carry the methyl groups. These compounds may carry additional substituents in the anthraquinone molecules such as amino, nitro, or methyl groups.

While it is known that the diaminodianthraquinonylamines on sulfonation dye wool in gray shades, the compounds of the present invention are distinguished from those which do not carry the phenylamino groups in their ease of sulfonation since they do not require oleum of high concentrations or the use of mercury or boric acid as a catalyst. In the case of the dialkylamino-dianthraquinonylamines the use of oleum of high concentrations and relatively high temperatures tends to dealkylate the products. This is avoided in the preparation of the products of this application because of the ease with which these new products can be sulfonated.

The following examples are given to illustrate the invention. The parts used are by weight.

Example 1

Four hundred (400) parts of 4:4'-dinitro-1:1'-dianthrimide are reacted with 2000 parts of paraxylidine in the presence of 240 parts of anhydrous sodium acetate at 180–190° C. for a period of 16 hours. When the condensation is complete, the reaction mass is cooled to room temperature over a period of eight hours and diluted with 4000 parts of ethyl alcohol. It is then stirred for two hours additional and filtered. It is washed with additional alcohol and then with hot water. The filter cake is then dried at 100–110° C. It corresponds to the following formula:

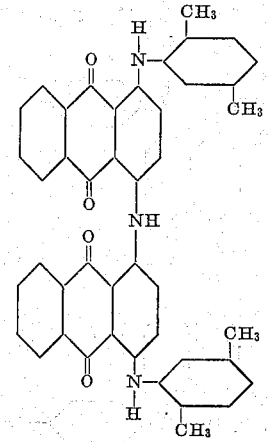

Fifty parts of the above base are dissolved over a period of one hour in 500 parts of sulfuric acid monohydrate. When the base has been entirely dissolved, there are then added 60 parts of 65% oleum. The sulfonation mass is then raised to a temperature of 70–80° C. over a period of one hour and held there until a drop of the sulfonation mass is completely soluble in 10 cc. of warm water. When sulfonation is complete, the sulfonation mass is dropped into a mixture of 5000 parts of ice and water. The diluted sulfonation mass is then filtered. The precipitated free acid of the dyestuff is washed with brine until it is acid free and is then dried at 100–110° C. The product dyes wool from an acid bath in gray shades of excellent fastness to light and fulling. Upon chroming, very little change takes place and the shade remains gray.

*Example 2*

Thirty (30) parts of 4:4'-dibromo-1:1'-dianthrimide (obtained from the direct bromination of 1:1'-dianthrimide in nitrobenzene with bromine and sulfuryl chloride) are reacted with 120 parts of para-xylidine in the presence of 90 parts of water, 30 parts of ammonium acetate and one part of basic copper acetate at a reflux temperature of 100–105° C. for approximately 10 hours. When the reaction is finished, the condensation mass is filtered off, washed with 200 parts of ethyl alcohol and finally with hot water. The cake is dried at 100–110° C. It corresponds exactly to the base shown in Example 1 and when sulfonated gives the identical gray dyestuff.

*Example 3*

If in Example 1 or 2, there are substituted either ortho or meta-xylidine in place of paraxylidines, there are obtained the corresponding di-ortho and di-meta-xylidino dianthraquinonylamines. Upon sulfonation in the manner described in Example 1, gray wool dyestuffs of slightly different shade are obtained.

*Example 4*

Thirty (30) parts of 5:5'-dinitro-4:4'-dibromo-1:1'-dianthraquinonylamine are reacted with 120 parts of para-toluidine in the presence of 90 parts of water, 30 parts of ammonium acetate and 0.5 part of copper acetate at a reflux temperature for 10 hours. The finished condensation mass is cooled to 70° C. and diluted with 150 parts of alcohol. The condensation is then cooled to room temperature, filtered, and washed with alcohol and finally with hot water. It is dried at 100–110° C. and corresponds to the following formula:

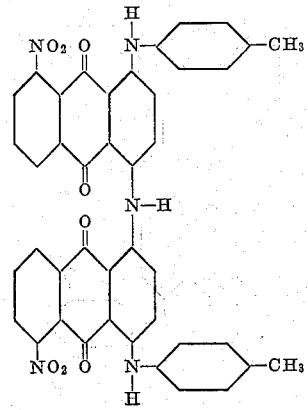

When sulfonated in the usual manner, a gray dyestuff for wool and related fibers is obtained which exhibits good fastness to light, fulling and washing. If in the above example, ortho or meta-toluidine are substituted for para-toluidine, various other shades of gray are obtained. Similarly, the use of the various xylidines in place of the toluidines yields still other shades of gray which also exhibit good fastness properties.

*Example 5*

Fifteen (15) parts of 5:5'-dinitro-4:4'-di-para-toluidino - 1:1'-dianthraquinolyamine as obtained in Example 4 are reacted with 150 parts of 34% sodium sulfhydrate in the presence of 100 parts of water and 3 parts of sodium hydroxide at a boil for ½ hour. The reduction mass is then filtered, washed with hot water until free of sodium sulfhydrate and then dried at 100–110° C.

The compound formed corresponds to the following formula:

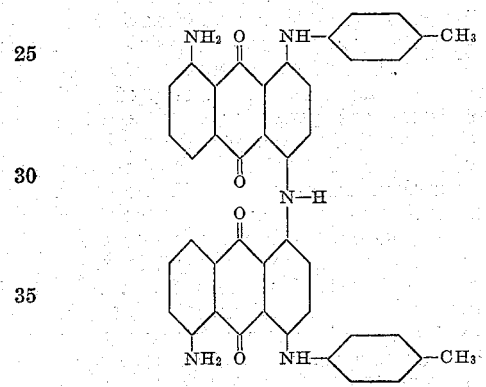

The color base as described above sulfonates easily in monohydrate at 80° C. and gives a bluish-gray dyestuff which dyes wool in bluish-gray shades which exhibit good fastness properties.

I claim:

1. Compounds of the group consisting of 4,4'-di-(toluidino)-1,1'-dianthrimide sulfonic acid and 4,4'-di-(xylidino)-1,1'-dianthrimide sulfonic acid; their alphanitro- and alphamino-substitution derivatives and the alkali metal salts of such sulfonic acids.

2. 4,4' - dixylidino-1,1'-dianthrimide sulfonic acid and its alkali metal salts, which dye wool and related fibers in gray shades of good fastness properties.

3. 4,4' - di-p-toluidino - 5,5'-dinitro-1,1'-dianthrimide sulfonic acid and its alkali metal salts, which dye wool and related fibers in gray shades of good fastness properties.

4. 4,4' - di-p-toluidino - 5,5'-diamino-1,1'-dianthrimide sulfonic acid and its alkali metal salts, which dye wool and related fibers in bluish gray shades of good fastness properties.

EDWIN C. BUXBAUM.